(12) United States Patent
Teggatz et al.

(10) Patent No.: US 9,853,441 B2
(45) Date of Patent: *Dec. 26, 2017

(54) VOLTAGE TRANSIENT PROTECTION CIRCUITRY

(71) Applicant: TRIUNE SYSTEMS, LLC, Plano, TX (US)

(72) Inventors: Ross E. Teggatz, Plano, TX (US); Wayne T. Chen, Plano, TX (US); Brett Smith, Plano, TX (US)

(73) Assignee: TRIUNE SYSTEMS, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,647

(22) Filed: Jan. 5, 2016

(65) Prior Publication Data

US 2016/0134099 A1     May 12, 2016

Related U.S. Application Data

(63) Continuation of application No. 13/540,902, filed on Jul. 3, 2012, now Pat. No. 9,231,400.

(60) Provisional application No. 61/506,118, filed on Jul. 10, 2011.

(51) Int. Cl.
    *H02H 3/22* (2006.01)
(52) U.S. Cl.
    CPC ..................................... *H02H 3/22* (2013.01)
(58) Field of Classification Search
    CPC ........ H02H 3/22; H02H 9/04; H01L 27/0248; H01L 27/0251; H01L 27/0266

USPC ...... 361/111; 326/24, 31, 33, 34, 36, 50, 58, 326/81; 327/84, 92, 179, 180, 307, 309, 327/310, 321, 379, 388, 409, 410, 424, 327/530, 545–547, 551

See application file for complete search history.

(56) References Cited

U.S. PATENT DOCUMENTS

| | | | |
|---|---|---|---|
| 5,864,227 | A  | 1/1999  | Borden et al. |
| 6,229,273 | B1 | 5/2001  | Kelly et al. |
| 7,808,127 | B2 | 10/2010 | Teggatz et al. |
| 7,827,334 | B2 | 11/2010 | Teggatz et al. |
| 7,859,911 | B2 | 12/2010 | Teggatz et al. |
| 7,982,492 | B2 | 7/2011  | Atrash et al. |
| 8,102,713 | B2 | 1/2012  | Teggatz et al. |
| 8,102,718 | B2 | 1/2012  | Teggatz et al. |
| 8,300,375 | B2 | 10/2012 | Teggatz et al. |
| 8,373,436 | B2 | 2/2013  | Atrash et al. |
| 8,408,900 | B2 | 4/2013  | Teggatz et al. |
| 8,441,866 | B2 | 5/2013  | Teggatz et al. |
| 8,461,847 | B2 | 6/2013  | Teggatz et al. |

(Continued)

FOREIGN PATENT DOCUMENTS

| | | |
|---|---|---|
| WO | 2015/195403 A2 | 12/2015 |
| WO | 2016/019137 A2 | 2/2016  |
| WO | 2016/019139 A1 | 2/2016  |

*Primary Examiner* — Scott Bauer
*Assistant Examiner* — Kevin J Comber
(74) *Attorney, Agent, or Firm* — Jackson Walker LLP; Christopher J. Rourk; Thomas B. Hayes

(57) ABSTRACT

Disclosed are advances in the arts with novel and useful voltage transient protection circuitry in configurations which include a bridge circuit in combination with one or more voltage reference, load to ground circuit, and/or snub circuit such that the output node is held at a selected voltage level, preferably mid-rail, and potentially damaging transient voltages are avoided.

20 Claims, 3 Drawing Sheets

(56) References Cited

U.S. PATENT DOCUMENTS

| | | |
|---|---|---|
| 8,552,336 B2 | 10/2013 | Blackall et al. |
| 8,583,037 B2 | 11/2013 | Atrash et al. |
| 8,584,961 B2 | 11/2013 | Teggatz et al. |
| 8,664,745 B2 | 3/2014 | Teggatz et al. |
| 8,687,385 B2 | 4/2014 | Teggatz et al. |
| 8,693,261 B2 | 4/2014 | Teggatz et al. |
| 8,704,450 B2 | 4/2014 | Chen et al. |
| 8,743,522 B2 | 6/2014 | Terratz et al. |
| 8,768,455 B2 | 7/2014 | Teggatz et al. |
| 8,896,318 B2 | 11/2014 | Teggatz et al. |
| 8,964,418 B2 | 2/2015 | Atrash et al. |
| 9,083,391 B2 | 7/2015 | Teggatz et al. |
| 9,089,029 B2 | 7/2015 | Teggatz et al. |
| 9,106,221 B2 | 8/2015 | Atrash et al. |
| 9,134,741 B2 | 9/2015 | Atrash et al. |
| 9,214,867 B2 | 12/2015 | Teggatz et al. |
| 9,225,199 B2 | 12/2015 | Teggatz et al. |
| 9,225,293 B2 | 12/2015 | Teggatz et al. |
| 9,231,400 B2 | 1/2016 | Chen et al. |
| 9,343,988 B2 | 5/2016 | Teggatz et al. |
| 9,354,268 B2 | 5/2016 | Teggatz et al. |
| 2008/0061876 A1* | 3/2008 | Kaya ............... H03F 3/217 330/207 P |
| 2008/0252372 A1 | 10/2008 | Williams |
| 2011/0008527 A1 | 1/2011 | Teggatz et al. |
| 2011/0163794 A1* | 7/2011 | Soma ............ H01L 21/823412 327/534 |
| 2012/0025752 A1 | 2/2012 | Teggatz et al. |
| 2012/0028845 A1 | 2/2012 | Teggatz et al. |
| 2012/0139357 A1 | 6/2012 | Teggatz et al. |
| 2012/0139358 A1 | 6/2012 | Teggatz et al. |
| 2012/0188673 A1 | 7/2012 | Teggatz et al. |
| 2012/0242164 A1 | 9/2012 | Teggatz et al. |
| 2012/0248893 A1 | 10/2012 | Teggatz et al. |
| 2012/0274838 A1 | 11/2012 | Teggatz et al. |
| 2013/0062967 A1 | 3/2013 | Teggatz et al. |
| 2013/0175982 A1 | 7/2013 | Teggatz et al. |
| 2013/0181724 A1 | 7/2013 | Teggatz et al. |
| 2013/0193771 A1 | 8/2013 | Teggatz |
| 2013/0224679 A1 | 8/2013 | Teggatz et al. |
| 2013/0241465 A1 | 9/2013 | Teggatz et al. |
| 2013/0257171 A1 | 10/2013 | Teggatz et al. |
| 2013/0257172 A1 | 10/2013 | Teggatz et al. |
| 2014/0062381 A1 | 3/2014 | Teggatz et al. |
| 2014/0225447 A1 | 8/2014 | Teggatz |
| 2014/0329720 A1 | 11/2014 | Teggatz et al. |
| 2015/0171758 A1 | 6/2015 | Atrash et al. |
| 2015/0256227 A1 | 9/2015 | Teggatz et al. |
| 2015/0318899 A1 | 11/2015 | Teggatz et al. |
| 2015/0326118 A1 | 11/2015 | Teggatz et al. |
| 2015/0341087 A1 | 11/2015 | Moore et al. |
| 2015/0372676 A1 | 12/2015 | Teggatz et al. |
| 2016/0004267 A1 | 1/2016 | Atrash et al. |
| 2016/0033979 A1 | 2/2016 | Teggatz et al. |
| 2016/0105115 A1 | 4/2016 | Teggatz et al. |
| 2016/0134191 A1 | 5/2016 | Teggatz et al. |

* cited by examiner

VOLTAGE TRANSIENT PROTECTION CIRCUITRY

RELATED APPLICATIONS

This application is a continuation of U.S. patent application Ser. No. 13/540,902, filed Jul. 3, 2012, now U.S. Pat. No. 9,231,400, which claims Priority to and benefit of U.S. Provisional Patent Application Ser. No. 61/506,118, filed on Jul. 10, 2011, which is hereby incorporated by reference for all purposes as if set forth herein in its entirety.

TECHNICAL FIELD

The invention relates to apparatus for protecting circuits from voltage transients. More particularly, the invention relates to apparatus providing voltage transient protection circuits for use with low voltage components in relatively higher voltage systems.

BACKGROUND GND OF THE INVENTION

In general with electronic components, and in particular when using integrated power FETs, the size of the device is directly proportional to the voltage rating of the device; The higher the breakdown and/or operating voltage of the device, the larger the silicon area that is used. As the size of devices increases, so does their cost, as well as the area and costs to implement any associated system. Traditionally, device operating voltages are selected based on the absolute maximum voltage the device can be expected to withstand, even in applications wherein it is not anticipated that the device should actually be operating at the theoretical maximum voltage level. This often results in wasted area and increased costs.

Due to these and other problems remaining in the state of the art, it would be useful and advantageous to provide circuitry designed to avoid or mitigate the occurrence of high transient voltage events, thereby facilitating the use of low voltage, smaller, circuit components.

SUMMARY OF THE INVENTION

In carrying out the principles of the present invention, in accordance with preferred embodiments, the invention provides advances in the arts with novel apparatus and systems directed to useful and advantageous voltage transient protection circuitry. According to aspects of the invention, preferred embodiments include circuit designs configured to use lower voltage components in circuits which may be anticipated to be subjected to relatively higher voltages.

According to one aspect of the invention, an example of a preferred embodiment of a voltage transient protection circuit is based on either a full or a half-H bridge circuit having a high-side device and a low-side device coupled to a power supply and ground, respectively. The high- and low-side devices each have a suitable gate drive. A voltage reference circuit is connected via a switch to the gate of the high-side device. The bridge circuit also includes an output node, and a load to ground circuit is connected to the output node. The circuit is configured such that the high-side device may be operated under selected voltage conditions and deactivated in the event of a selected high voltage condition, such that the output node is held at, and is not permitted to exceed, a selected voltage level.

According to another aspect of the invention, in an exemplary embodiment a voltage transient protection circuit as described above is implemented to hold an output node at a mid-rail voltage level.

According to an aspect of the invention, in a preferred embodiment, a voltage transient protection circuit is provided in an implementation including a bridge circuit with a high-side device connected with a power supply and gate drive, and a low-side device connected to ground and a gate drive. An output node of the bridge circuit is switchably connected with a voltage reference circuit. The voltage reference circuit may be operated under selected voltage conditions and deactivated in the event of a selected high voltage condition, such that the output node is held at a selected voltage level.

According to another aspect of the invention, in an exemplary embodiment similar to that described immediately above, the voltage transient protection circuit output node is held at a mid-rail voltage level.

According to one aspect of the invention, in an example of a preferred embodiment, a voltage transient protection circuit configuration includes a half-H or full bridge circuit with a high-side device coupled to a power supply and a gate drive, the bridge circuit further includes a low-side device connected to ground and a gate drive. The bridge circuit also has an output node. A voltage reference circuit is connected, via a switch, to the gate of the high-side device such that the high-side device may be operated under first selected voltage conditions and deactivated in the event of a selected high voltage condition. Additionally, a low-side snub circuit is provided between the low-side gate and the output node such that the low-side device may be operated under second selected voltage conditions and deactivated in the event of a selected low voltage condition. Accordingly, this configuration provides a circuit through which a deadband voltage region is defined wherein neither the high-side device nor the low-side device operates.

The invention has advantages including but not limited to providing at least one of the following features, area and/or cost savings. These and other advantageous features and benefits of the present invention can be understood by one of ordinary skill in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to like references in the various drawings unless otherwise noted. Descriptive and directional terms used in the written description such as front, back, top, bottom, upper, side, et cetera; refer to the drawings themselves as laid out on the paper and not to physical limitations of the invention unless specifically noted. The drawings are not to scale, and some features of embodiments shown and discussed are simplified or amplified for illustrating principles and features, as well as advantages of the invention.

DESCRIPTION OF PREFERRED EMBODIMENTS

While the making and using of various exemplary embodiments of the invention are discussed herein, it should be appreciated that the present invention provides inventive concepts which can be embodied in a wide variety of specific contexts. It should be understood that the invention may be practiced with various equivalent circuit arrangements and substitute electronic components without altering the principles of the invention. For purposes of clarity, detailed descriptions of functions, components, circuits and systems familiar to those skilled in the applicable arts are not included. In general, the invention provides novel and advantageous advances in terms of improving voltage transient protection circuitry area and cost savings.

Figure 1:
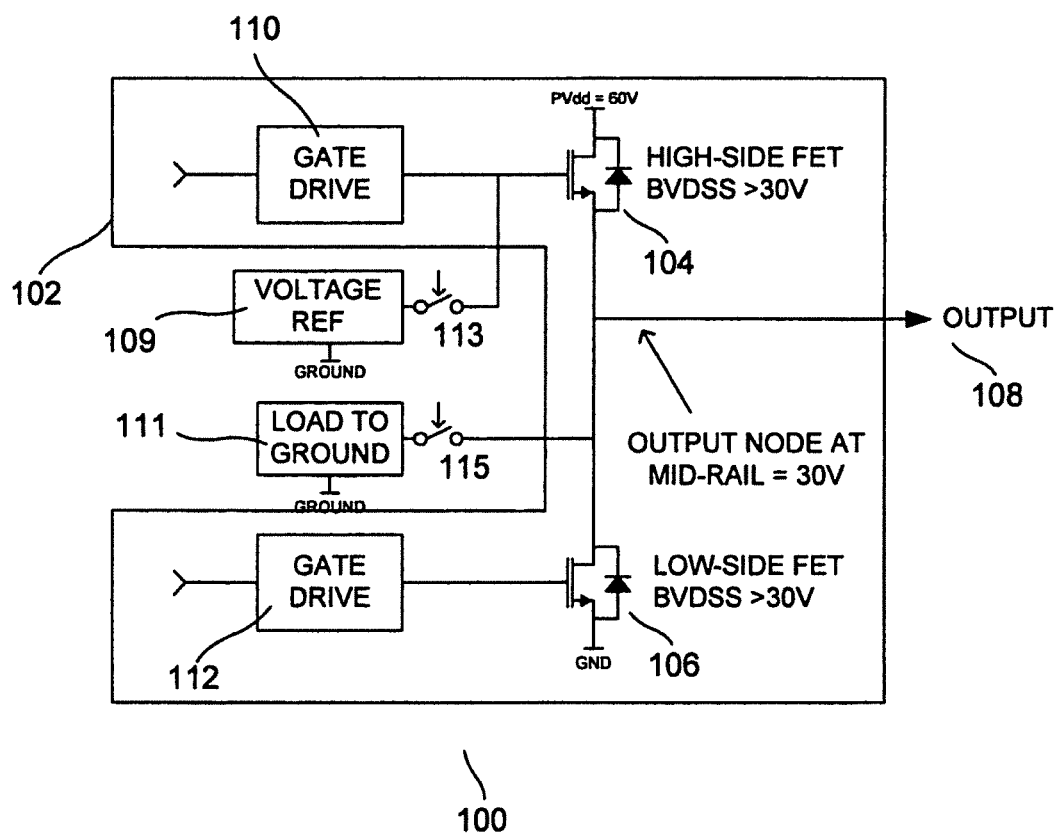
FIG. 1 is a simplified schematic diagram depicting an example of a preferred embodiment of a voltage transient protection circuit implementing the principles of the invention.

In an example of an embodiment of voltage transient protection circuitry useful for biasing low voltage components in a higher voltage system, FIG. 1 shows a circuit 100 in which a half-H bridge configuration 102 has power supplies at PVDD and ground GND, where PVDD can be as high as 60V for absolute maximum rating, although maximum operating voltage is <30V. A full H-bridge circuit may also be used. For voltages >30V on PVDD, the circuit 100 is designed to detect over-voltage and stop the high- and low-side devices, in this example FETs, 104, 106 respectively, from switching. For the duration of this over-voltage condition, the voltage at the output node 108 is held at mid-rail, in this example 30V, which does not exceed the breakdown voltage of either the high-side device or the low-side device 106. Suitable gate drives 110, 112 are provided for operation of the high- and low-side devices 104, 106. Some of the advantages inherent in the use of this circuit structure 100 can be observed at the output node 108 voltage by raising the power supply voltage PVDD, while connecting a load tied to the output 108 and either ground GND or supply PVDD. In the event the output node 108 remains at or near mid-rail voltage under this condition, this demonstrates that the circuit 100 is holding this output 108 at the mid-rail voltage. In this example, it can be seen that a voltage reference 109 from the high-side device 104 gate to ground GND is provided in combination with a load to ground GND connection on the output node 108. During operation, the high-side device 104 functionally becomes a source-follower, providing a pull-up voltage on the output node 108. However, the voltage that it can pull up is limited to the voltage reference 109 minus the gate-to-source voltage (Vgs) of the high-side device 104. The load on the output node 108 provides a pull-down to ground GND to keep the high-side source-follower device 104 biased. The voltage reference circuit 109 may be implemented using a diode/zener stack, and connected to the high-side device 104 gate via a switch 113 as needed. Alternatively, the voltage reference circuit 109 may be configured as resistor divider from the power supply PVDD and ground GND. The load to ground circuit component 111 may be implemented using a resistor, current source, the low-side device 106 turned-on weakly, or load(s) external to the circuit 100 connected at the output node 108 (e.g., feedback resistors, pull-down resistors, and the like). Advantages of this circuit configuration 100 include providing the ability to enable the use of smaller, low voltage components in order to save area and cost.

Figure 2:
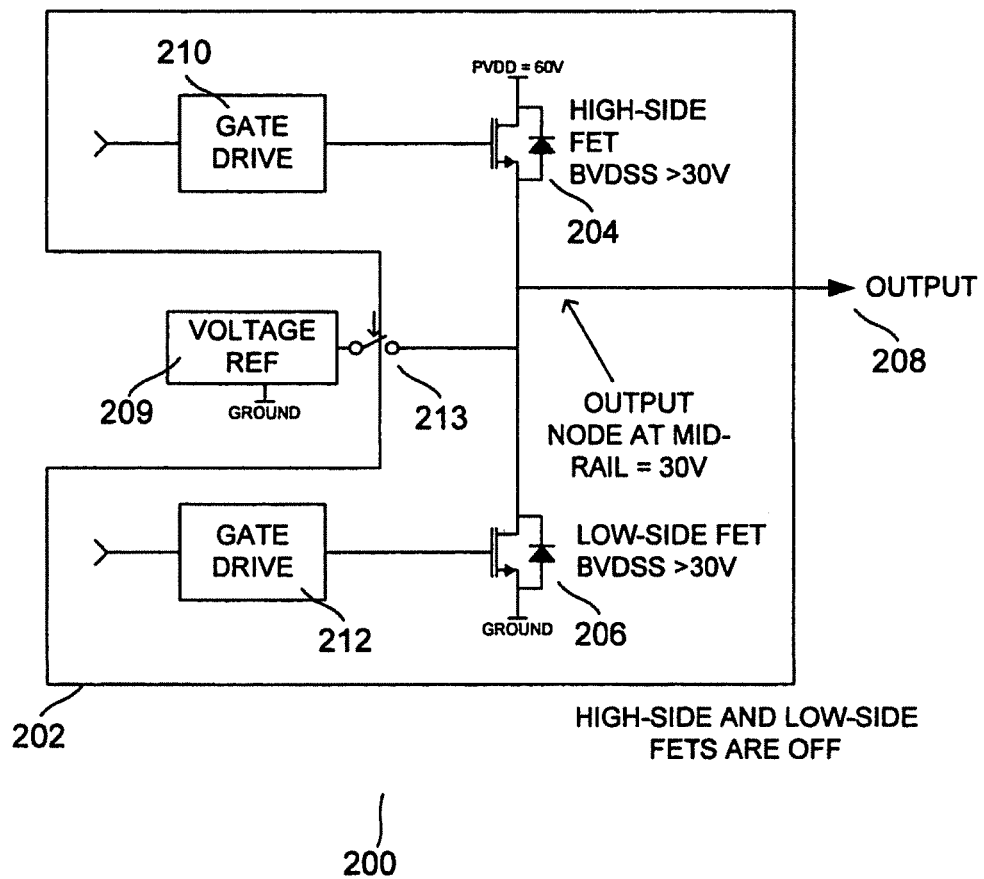
FIG. 2 is a simplified schematic diagram illustrating another example of a preferred embodiment of a voltage transient protection circuit according to the invention.

An alternative preferred embodiment of the invention is depicted in FIG. 2. As shown, a circuit 200 includes a half-H bridge configuration 202 with power supplies at PVDD and ground GND, where PVDD can be as high as 60V for absolute maximum rating, although maximum operating voltage is <30V. For voltages >30V on PVDD, the circuit 200 is designed to detect over-voltage and stop the high and low-side devices, FETs 204, 206 respectively, from switching. For the duration of this condition, the voltage at the output node 208 is held at mid-rail, in this example 30V, which does not exceed the breakdown voltage of either of the FETs 204, 206. Suitable gate drives 210, 212 are provided for operation of the high and low-side devices 204, 206. In this exemplary embodiment, a voltage reference circuit 209 is provided between ground GND and the output node 208. During operation, the high and low-side 204, 206 devices are maintained in an "off" state when transient voltage protection is required, and the voltage reference circuit 209 maintains the output node 208 at a selected voltage level, such as mid-rail. The voltage reference circuit 209 may preferably be implemented using an amplifier, which may be used to apply a selected voltage at the output node 209 in applications wherein it is desirable to bias the output node 208 to a selected voltage level prior to switching. For example, this configuration may be used to advantage to eliminate pop and click noise in an audio system requiring biasing of an output node to a common-mode voltage prior to switching. The voltage reference circuit 209 may alternatively also be implemented using a diode or zener stack, or in the form of a resistor divider circuit. As with the other exemplary embodiments shown and described, a full H-bridge architecture may also be used.

Figure 3:
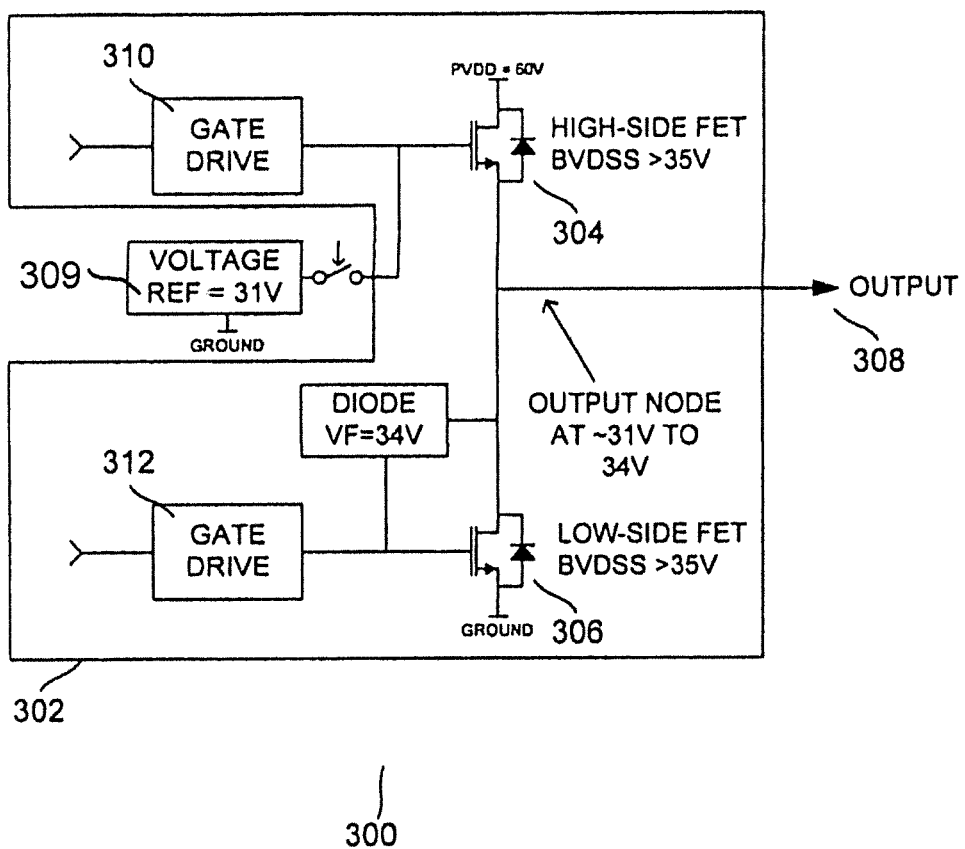
FIG. 3 is simplified schematic diagram showing an example of a preferred embodiment of a voltage transient protection circuit.

Another alternative for applying the principles of the invention is to use the high-side device 310 as a source follower, and the low-side device 308 as a snub device by the addition of a snub circuit 309. An example of an embodiment of a voltage transient protection circuit 300 developed employing this approach is shown in FIG. 3. It should be appreciated by those skilled in the art that, in this case, there is an overlapping voltage region in which the low-side device 306 turns on once the output node 308 reaches a higher voltage than the voltage at which the source-follower 304 turns on. This provides a deadband voltage region where neither the high-side device 304 nor the low-side device 306 is turned on, thereby saving current. The deadband voltage region is preferably near to the mid-rail voltage level so as not to approach the breakdown voltage of the high- and low-side devices 304, 306, e.g., FETs. In the event the voltage at the output node 308 drifts outside of the deadband region, then either the high-side device 304 or low-side device 306 responds by turning on to pull the output node 308 voltage back to the deadband region. In this way, a selected voltage level may be maintained, in this example, approximately mid-rail voltage, e.g., between 31V and 34V. The snub circuit 309 may be implemented using a suitable device such as a diode.

Many variations of the voltage transient protection circuitry shown and described herein are possible within the scope of the invention. Implementations may include alternative equivalent circuit configurations and various component selections. The principles and examples described may be used individually and/or in combination with one another and in the context of larger electronic circuits and systems.

The apparatus of the invention provide one or more advantages including but not limited to, providing opportunities for reductions in device size and saving in costs. While the invention has been described with reference to certain illustrative embodiments, those described herein are not intended to be construed in a limiting sense. For example, variations or combinations of steps or materials in the embodiments shown and described may be used in particular cases without departure from the invention. All of the aspects of implementations of the voltage transient protection circuitry can be combined in various ways. Various modifications and combinations of the illustrative embodiments as well as other advantages and embodiments of the invention will be apparent to persons skilled in the arts upon reference to the drawings, description, and claims.

We claim:

1. A voltage transient protection circuit in a configuration comprising:
    a voltage reference circuit operably coupled by a switch to a gate of a high-side device; and
    a load to ground circuit operably coupled to an output node;
    wherein the high-side device is configured to be operated under selected voltage conditions and deactivated in response to a selected high voltage condition, to hold the output node at a selected voltage level.

2. A voltage transient protection circuit according to claim 1 wherein the output node is held at a mid-rail voltage level.

3. A voltage transient protection circuit according to claim 1 wherein the voltage reference circuit further comprises a diode.

4. A voltage transient protection circuit according to claim 1 wherein the voltage reference circuit further comprises a zener diode.

5. A voltage transient protection circuit according to claim 1 wherein the voltage reference circuit further comprises an amplifier.

6. A voltage transient protection circuit according to claim 1 wherein the voltage reference circuit further comprises a resistor divider circuit electrically connected between power supply and ground.

7. A voltage transient protection circuit according to claim 1 wherein the load to ground circuit further comprises a resistor.

8. A voltage transient protection circuit according to claim 1 wherein the load to ground circuit further comprises a current source.

9. A voltage transient protection circuit according to claim 1 wherein the load to ground circuit further comprises the low-side device in an "on" state.

10. A voltage transient protection circuit according to claim 1 wherein the load to ground circuit further comprises an external load.

11. A voltage transient protection circuit in a configuration comprising:
    a bridge circuit having an output node;
    a voltage reference circuit operably coupled by a switch to the output node; and
    wherein the voltage reference circuit is configured to operate under selected voltage conditions and to be deactivated in response to a selected high voltage condition, such that the output node is held at a selected voltage level.

12. A voltage transient protection circuit according to claim 11 wherein the output node is held at a mid-rail voltage level.

13. A voltage transient protection circuit according to claim 11 wherein the bridge circuit further comprises a half-H bridge circuit.

14. A voltage transient protection circuit according to claim 11 wherein the bridge circuit further comprises a full H-bridge circuit.

15. A voltage transient protection circuit according to claim 11 wherein the voltage reference circuit further comprises a diode.

16. A voltage transient protection circuit in a configuration comprising:
    a voltage reference circuit operably coupled by a switch to a gate of a high-side device, whereby the high-side device is configured to be deactivated in response to a selected high voltage condition;
    a low-side snub circuit operably coupled between a gate of a low-side device and an output node, whereby the low-side device is configured to be deactivated in response to a selected low voltage condition; and
    wherein a deadband voltage region is provided by the configuration of the high side device and the low side device where neither the high-side device nor the low-side device operates.

17. A voltage transient protection circuit according to claim 16 wherein the deadband region approximately encompasses a mid-rail voltage level.

18. A voltage transient protection circuit according to claim 16 wherein the high-side device and the low-side device further comprise a half-H bridge circuit.

19. A voltage transient protection circuit according to claim 16 wherein the high-side device and the low-side device further comprise further comprise a full H-bridge circuit.

20. A voltage transient protection circuit according to claim 16 wherein the low-side snub circuit further comprises a diode.

* * * * *

UNITED STATES PATENT AND TRADEMARK OFFICE
CERTIFICATE OF CORRECTION

Page 1 of 1

PATENT NO. : 9,853,441 B2
APPLICATION NO. : 14/988647
DATED : December 26, 2017
INVENTOR(S) : Ross E. Teggatz et al.

It is certified that error appears in the above-identified patent and that said Letters Patent is hereby corrected as shown below:

In the Claims

1. In Column 6, Line 37, in Claim 17, delete "deadband region" and insert -- deadband voltage region --, therefor.

2. In Column 6, Line 44, in Claim 19, delete "further comprise further comprise" and insert -- further comprise --, therefor.

Signed and Sealed this
Twentieth Day of November, 2018

Andrei Iancu
*Director of the United States Patent and Trademark Office*